United States Patent [19]
Chertkow

[11] Patent Number: 6,130,771
[45] Date of Patent: Oct. 10, 2000

[54] RADIATION VALVE AND VALVE ARRAY

[75] Inventor: Roberto Igal Chertkow, Ashdod, Israel

[73] Assignee: Song Micro Technology Ltd., Israel

[21] Appl. No.: 09/259,277

[22] Filed: Mar. 1, 1999

Related U.S. Application Data

[62] Division of application No. 09/045,889, Mar. 23, 1998, abandoned.
[60] Provisional application No. 60/043,875, Apr. 10, 1997, and provisional application No. 60/059,730, Sep. 23, 1997.

[51] Int. Cl.$^7$ .................................................. G02B 26/00
[52] U.S. Cl. ........................................... 359/227; 359/230
[58] Field of Search ................................... 359/227, 229, 359/230, 282; 250/229; 345/32

[56] References Cited

U.S. PATENT DOCUMENTS 6,034,807  3/2000  Little et al. .............................. 359/227

*Primary Examiner*—Hung Xuan Dang
*Attorney, Agent, or Firm*—Mark M. Friedman

[57] ABSTRACT

A radiation valve includes a transparent substrate and at least one opaque flexible planar member, rigidly attached to the substrate, that alternately assumes a closed orientation relative to the substrate to block the radiation and an open orientation relative to the substrate to pass the radiation. Preferably, the valve includes two parallel electrically conducting planar members that are perpendicular to the substrate when the valve is open. The valve is closed by imposing a voltage difference on the two planar members to snap their tops together. An array of such valves can be controlled to modulate the radiation temporally and spatially, for applications such as flat panel displays. This array is fabricated by steps including the formation of temporary surfaces perpendicular to the substrate; depositing a deposant at an oblique angle to the substrate, the temporary surfaces shadowing each other so that the deposant is deposited only on the temporary surfaces to form the planar members; and removing the temporary surfaces, leaving behind only the planar members.

3 Claims, 13 Drawing Sheets

|     |     |     |     |
|-----|-----|-----|-----|
| 36a | 36b | 36c | 36d |
| 36e | 36f | 36g | 36h |
| 36i | 36j | 36k | 36l |
| 36m | 36n | 36o | 36p |

|     |     |     |     |     |     |
|-----|-----|-----|-----|-----|-----|
| 40a | 40b | 40c | 40d | 40e | 40f |
| 40g | 40h | 40i | 40j | 40k | 40l |
| 42a | 42b | 42c | 42d | 42e | 42f |
| 42g | 42h | 42i | 42j | 42k | 42l |
| 44a | 44b | 44c | 44d | 44e | 44f |
| 44g | 44h | 44i | 44j | 44k | 44l |

RADIATION VALVE AND VALVE ARRAY

This is a Divisional Application of U.S. patent application Ser. No. 09/045,889 filed Mar. 23, 1998 now abandoned and Provisional Application No. 60/043,875 filed Apr. 10, 1997 and U.S. Provisional No. 60/059,730 filed Sep. 23, 1997.

FIELD AND BACKGROUND OF THE INVENTION

The present invention relates to the modulation of electromagnetic radiation and, more particularly, to a mechanical valve, and an array of such valves, for regulating the flow of radiation by selectively blocking the radiation.

Transmissive devices for modulating the flow of electromagnetic radiation, such as visible, infrared and ultraviolet radiation, are known. The simplest such devices are mechanical shutters. These devices have the advantage of being broad band, inasmuch as the materials used are opaque, in the thicknesses typically used, over a very wide spectral range; but typically these devices are too large to allow spatial modulation of the radiation on a short length scale approaching the wavelength of the radiation. In addition, their mechanical inertia places a lower bound on the time scale of this modulation. Spatial modulation on a short length scale, and temporal modulation on a short time scale, typically require the manipulation, by electrical, magnetic or electronic means, of the optical properties of substances such as liquid crystals. These optical properties generally are strong functions of wavelength, and so restrict the operation of such devices to particular spectral bands.

Reflective devices for fine spatial and temporal modulation of electromagnetic radiation over a relatively wide spectral range are known. These devices include, for example, the deformable mirror device described in U.S. Pat. No. 5,083,857 to Hornbeck. These devices typically consist of arrays of reflectors, each reflector corresponding to one pixel of a display. Such devices are inherently reflective, rather than transmissive, because the control electronics that addresses and activates each individual pixel is located behind the pixel, and would block the transmission of electromagnetic radiation across the pixel. Systems including such devices are inherently less compact than systems based on transmissive devices, because the light to be modulated must be directed at the device at an angle different from that at which the modulated, reflected light leaves the device.

There is thus a widely recognized need for, and it would be highly advantageous to have, a transmissive device, for fine spatial and temporal modulation of electromagnetic radiation, that operates over a wide spectral range.

SUMMARY OF THE INVENTION

According to the present invention there is provided a radiation valve including: (a) a substrate transparent to the radiation; and (b) a first planar member, at least partly flexible, opaque to the radiation, rigidly attached to the substrate, and operative to alternately assume an open orientation and a closed orientation with respect to the substrate, more of the radiation transiting the substrate when the first planar member is in the open orientation than when the first planar member is in the closed orientation.

According to the present invention there is provided a device for modulating radiation, including: (a) a substrate transparent to the radiation and having a surface; (b) a plurality of valves on the surface, each of the valves including a first at least partly flexible planar member that is opaque to the radiation, rigidly attached to the surface, and operative to alternatively assume an open orientation and a closed orientation with respect to the surface, more of the radiation transiting the substrate when the first planar member is in the open orientation than when the first planar member is in the closed orientation, the valves being arranged in at least one row and at least one column on the surface; and (c) for each of the at least one row, a mechanism for inducing the first planar member of at least one of the valves of the row to assume the orientations.

According to the present invention there is provided a display for displaying a pattern of spatially and temporally modulated radiation, including: (a) an array of a plurality of valves, in a common plane, for alternately transmitting and blocking the radiation, the valves being arranged in at least one row and in at least one column in the common plane; and (b) a control mechanism, for opening and closing the valves in accordance with the pattern, positioned laterally apart from the array of valves.

According to the present invention there is provided a method of modulating radiation, including the steps of: (a) providing a radiation modulator including: (i) a substrate transparent to the radiation and having a surface, and (ii) at least one valve on the surface, each of the at least one valve including a first, at least partly flexible planar member and a second, at least partly flexible planar member, the planar members being opaque to the radiation, rigidly attached to the surface, and operative to alternately assume an open orientation and a closed orientation with respect to the surface; (b) directing the radiation at the radiation modulator; and (c) for each of the at least one valve, alternately inducing the first planar member and the second planar member to both assume the open orientation and to both assume the closed orientation, more of the radiation transiting the substrate when both the planar members are in the open orientation than when both the planar members are in the closed orientation.

According to the present invention there is provided a method of fabricating a mesoscale device having a wall perpendicular to a substrate, including the steps of: (a) depositing photoresist on the substrate in a pattern including at least one surface substantially perpendicular to the substrate; (b) directing a first substantially parallel beam of atoms of a first deposant species at the at least one surface at a first oblique angle to the at least one surface, thereby depositing the wall of the first deposant species on the at least one surface; and (c) removing the photoresist.

According to the present invention there is provided a method of fabricating a mesoscale device including a substrate and a body, the body including at least two layers substantially perpendicular to the substrate, including the steps of: (a) depositing a first wall on the substrate, the first wall including a first surface substantially perpendicular to the substrate, the wall constituting a first of the two layers; and (b) directing a substantially parallel beam of atoms of a deposant species at the first surface at an oblique angle to the first surface, thereby forming a second of the two layers.

According to the present invention there is provided a method of modulating radiation to display successive frames of pixels, each of the frames having a duration, each of the pixels having an intensity, the method including the steps of: (a) providing an array of a plurality of valves, in a common plane, for alternately transmitting and blocking the radiation, the valves being arranged in a plurality of rows and in a plurality of columns in the common plane, each of the pixels corresponding to at least one of the valves; (b) directing the radiation at the array of valves; and (c) for each of the pixels, opening at least one of the at least one valve corresponding to the pixel for a fraction of the duration of the frame of the each pixel in accordance with the intensity of the each pixel.

According to the present invention there is provided a mesoscale device including: (a) a substrate; and (b) at least one wall, substantially perpendicular to the substrate, having a height of at least about 5 microns and a thickness of at most about 1 micron.

According to the present invention there is provided a mesoscale device including: (a) a substrate; and (b) a layer, above the substrate, at least about 5 microns thick and including at least one gap having a width of at most about 1 micron.

According to the present invention there is provided a three dimensional display for presenting an illusion of parallax to a first and second eye of a user, including: (a) a source of light; (b) an array of a plurality of valves, in a common plane, for alternately transmitting and blocking the light; (c) a mechanism for directing the light via a first subset of the valves towards the first eye of the user; and (d) a mechanism for directing the light via a second subset of the valves towards the second eye of the user.

As used herein, the term "radiation" includes all forms of radiation, both particles and waves, to which the principles of the present invention are applicable. Thus, for example, the term "radiation", as used herein, includes, but is not limited to, electromagnetic radiation and acoustic radiation. The illustrative examples herein are directed towards electromagnetic radiation, and primarily towards visible and infrared radiation. The radiation may be collimated or uncollimated, coherent or incoherent.

As used herein, the term "transparent", used in connection with a substrate, means that the radiation can propagate through the substrate. In the case of a substrate transparent to electromagnetic radiation, such as visible light or infrared light, the substrate need not be homogeneous. The index of refraction of the substrate may vary continuously. There may be discrete regions of different indices of refraction in the substrate, and some of these regions may be holes in the substrate occupied by vacuum or air.

As used herein, the term "opaque" refers to a material through which the radiation does not propagate. This material may absorb the radiation, may reflect the radiation, or may absorb a portion of the radiation while reflecting another portion of the radiation.

As discussed in more detail below, the scope of the present invention includes an innovative method for fabricating mesoscale devices, including the step of directing a parallel beam of atoms of a deposant species at a substrate. As used herein, the term "mesoscale" refers to devices whose components whose length scales are on the order of about 0.1 micron to about 100 microns and which generally are fabricated by photolithography. Familiar examples of such devices include integrated chips. Note that the defining length scales refer to the components, and not to the devices themselves, which, in the present context, may be several tens of centimeters across.

As used herein, the term "deposant species" refers to a chemical element, alloy or compound deposited on a substrate by processes commonly used in photolithography, for example, vacuum evaporation and sputtering. As used herein, the term "atom" includes both neutral atoms and ions. The beam of deposant atoms need not be homogeneous. For example, in the deposition of a layer of silica, the beam includes both silicon atoms and oxygen atoms.

The principle of the present invention is illustrated in FIGS. 1 and 2. FIG. 1 is a perspective view of a basic valve 10 of the present invention. Perpendicular to a surface 13 of a transparent, electrically insulating substrate 12 are mounted two thin rectangular leaves 14 and 16 made of an opaque, electrically conducting material. Leaves 14 and 16 are mutually parallel, as shown. Leaf 14 is rigidly mounted on a transparent, electrically conducting pad 20. Similarly, leaf 16 is rigidly mounted on a transparent, electrically conducting pad 22. Pads 20 and 22 are separated from each other by a transparent, electrically insulating layer 24, preferably of the same material as substrate 12. The upper portion of the side 15 of leaf 14 that faces leaf 16 is covered with a barrier 18 of an electrically insulating material.

It is to be understood that the terms "transparent" and "opaque" are relative to the wavelength of radiation that valve 10 is intended to modulate. For example, for the modulation of visible light, leaves 14 and 16 typically are made of aluminum, substrate 12 typically is made of silica glass, and pads 20 and 22 typically are made of indium tin oxide.

Leaves 14 and 16 are thin enough to be elastically flexible along at least part of their length in the direction perpendicular to side 15. The orientations of leaves 14 and 16 as they bend towards and away from each other are parametrized by the distance d between the tops of leaves 14 and 16. Appropriate electrical voltages are applied to pads 20 and 22 to induce leaves 14 and 16 to bend together or apart by electrostatic attraction. FIG. 2 is a schematic plot of the equilibrium value of d as a function of the difference V between a voltage applied to pad 20 and a voltage applied to pad 22. When no voltage difference is applied, d is equal to $d_{max}$, the separation of the bases of leaves 14 and 16. As V increases from 0, leaves 14 and 16 bend towards each other and d decreases, until point A on the curve is reached, at a critical voltage difference $V_{CR}$ at which the curve of d vs. V has a local maximum. At this point, leaves 14 and 16 snap together, as shown by the upper arrow, reducing d to the thickness l of insulating barrier 18. Note that in the absence of barrier 18, leaves 14 and 16 would discharge and snap apart. If V now is decreased, leaves 14 and 16 stay together until V is reduced to the threshold value $V_{TH}$ corresponding to d=l. At this point leaves 14 and 16 snap apart, as shown by the lower arrow. Thus, valve 10 is a bistable device that can be opened by setting V equal to a value $V_1$ less than $V_{TH}$, closed by setting V equal to a value $V_2$ greater than $V_{CR}$, and maintained in either orientation by setting V equal to a bias value $V_{BIAS}$ that is between, preferably halfway between, $V_{TH}$ and $V_{CR}$.

The mode of operation described above is a digital mode, in which valve 10 alternately occupies one of two discrete states, open and closed. Valve 10 also can be operated in an analog mode, in the distance range $A < d \leq d_{max}$, to achieve a continuous range of partial blockage of radiation.

A single valve 10 provides temporal modulation of radiation that is normally incident on surface 13 from either side of substrate 12: when valve 10 is open, the radiation passes between leaves 14 and 16, and when valve 10 is closed, leaves 14 and 16 block the radiation. Preferably, the material of leaves 14 and 16 reflects the radiation, rather than absorbing the radiation. This has two beneficial effects. First, valve 10 can be used in either a transmissive mode or in a reflective mode. In the transmissive mode, the radiation target is on the other side of valve 10 from the radiation source. Radiation traverses valve 10 to reach the target when valve 10 is open, but not when valve 10 is closed. In the reflective mode, the radiation target is on the same side of valve 10 as the radiation source. Radiation is reflected from valve 10 to the target when valve 10 is closed, but not when valve 10 is open. Second, valve 10 can be used to modulate intense radiation without overheating. It is clear that an array of valves 10 can be arranged in rows and columns on surface 13 to provide spatial modulation as well. In such an array, pads 20 are sections of row control lines and pads 22 are sections of column control lines.

It will be readily appreciated that the present invention may be scaled to accommodate many different types of electromagnetic radiation for a host of applications. In a digital display panel based on an array of valves 10, the pixel size, determined by the distance $d_{max}$, may be as small as several microns or as large as several centimeters. By making leaves 14 and 16 sufficiently thick, and applying correspondingly increased voltages to pads 20 and 22, valve 10 can be used to modulate x-rays.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a valve, and an array thereof, which can be used to modulate radiation both spatially and temporally.

The principles and operation of a radiation valve array according to the present invention may be better understood with reference to the drawings and the accompanying description.

Figure 1:
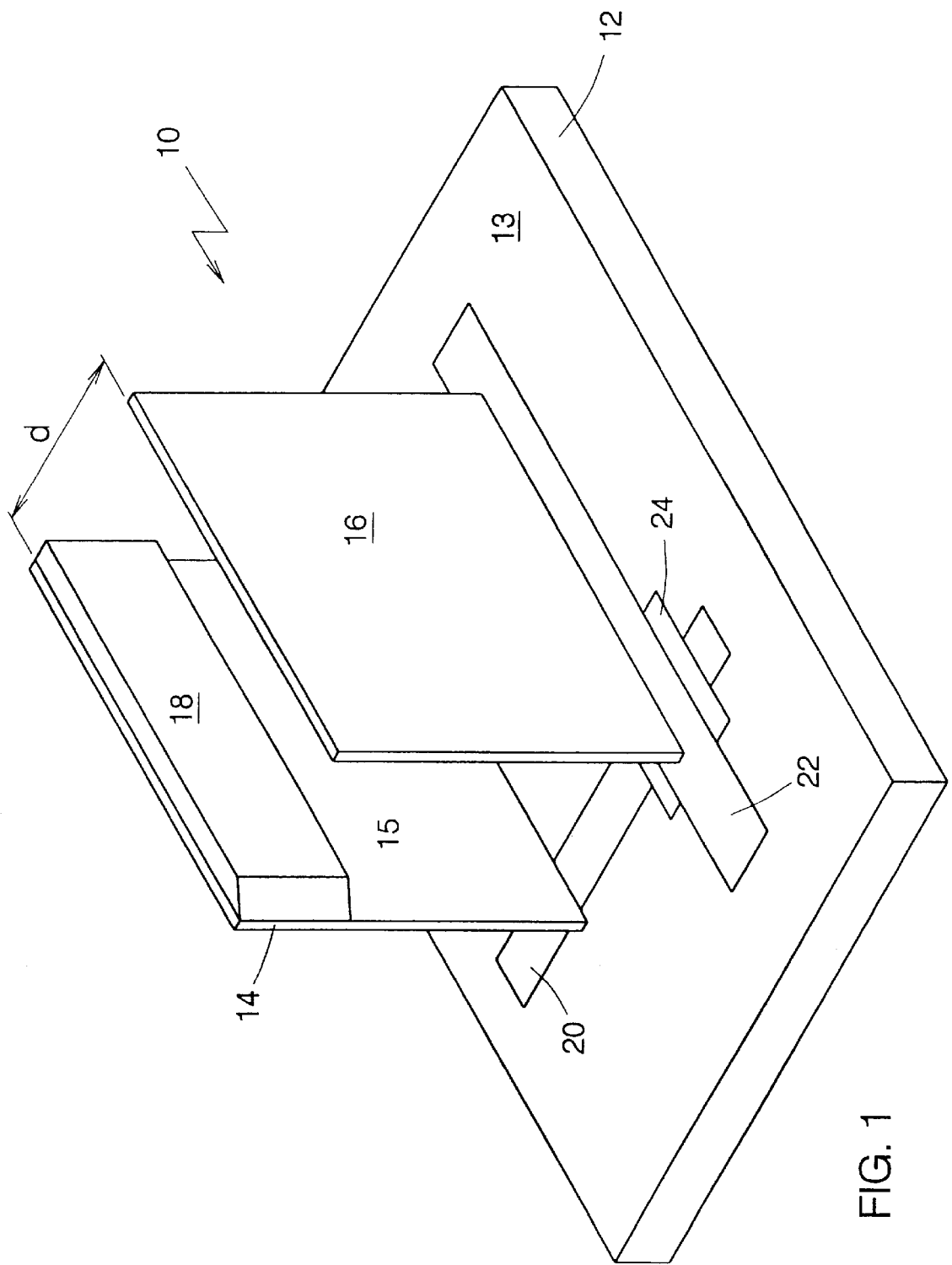
FIG. 1 is a perspective view of a valve of the present invention.
Figure 2:
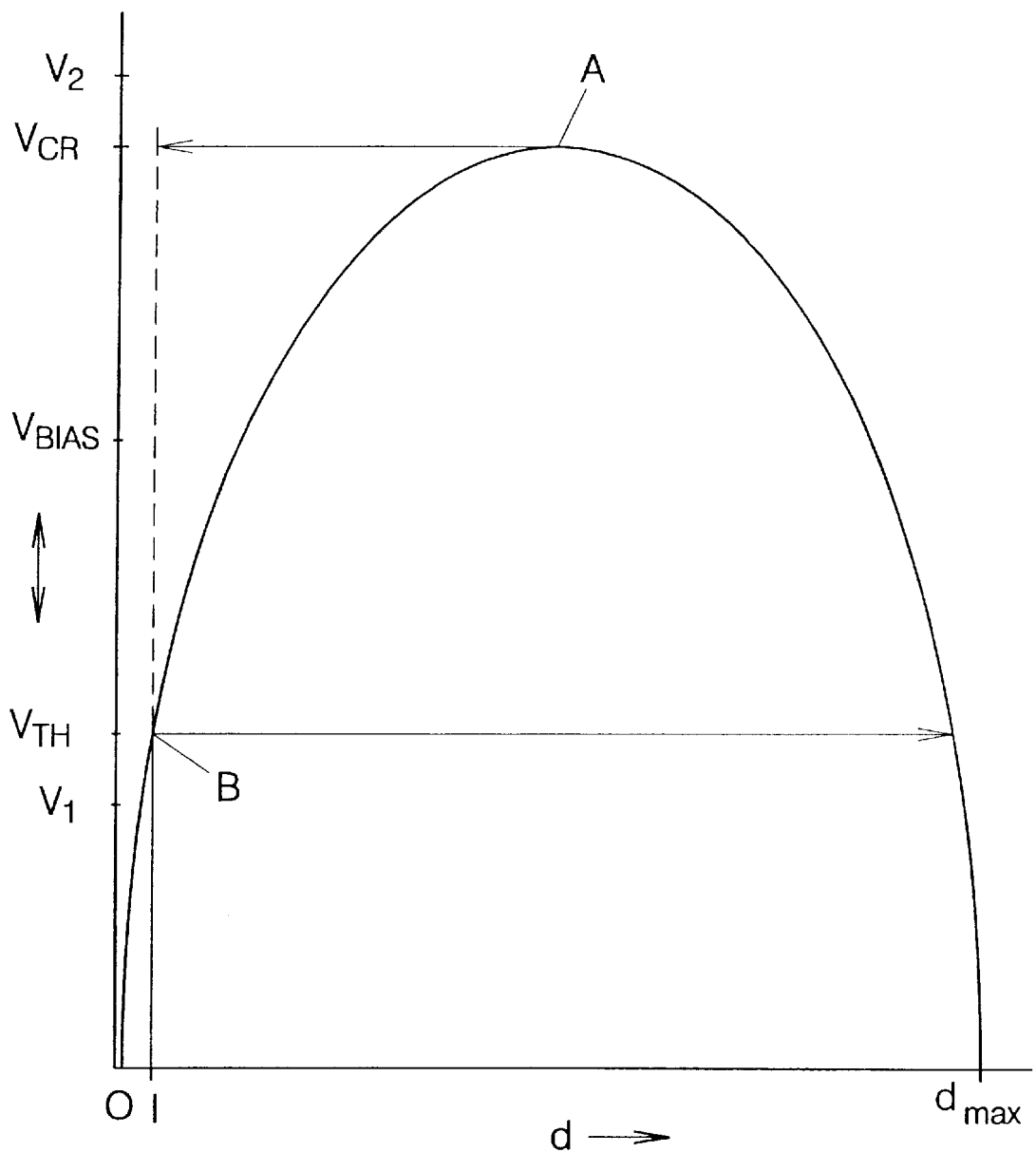
FIG. 2 illustrates the principle of the present invention.
Figure 3:
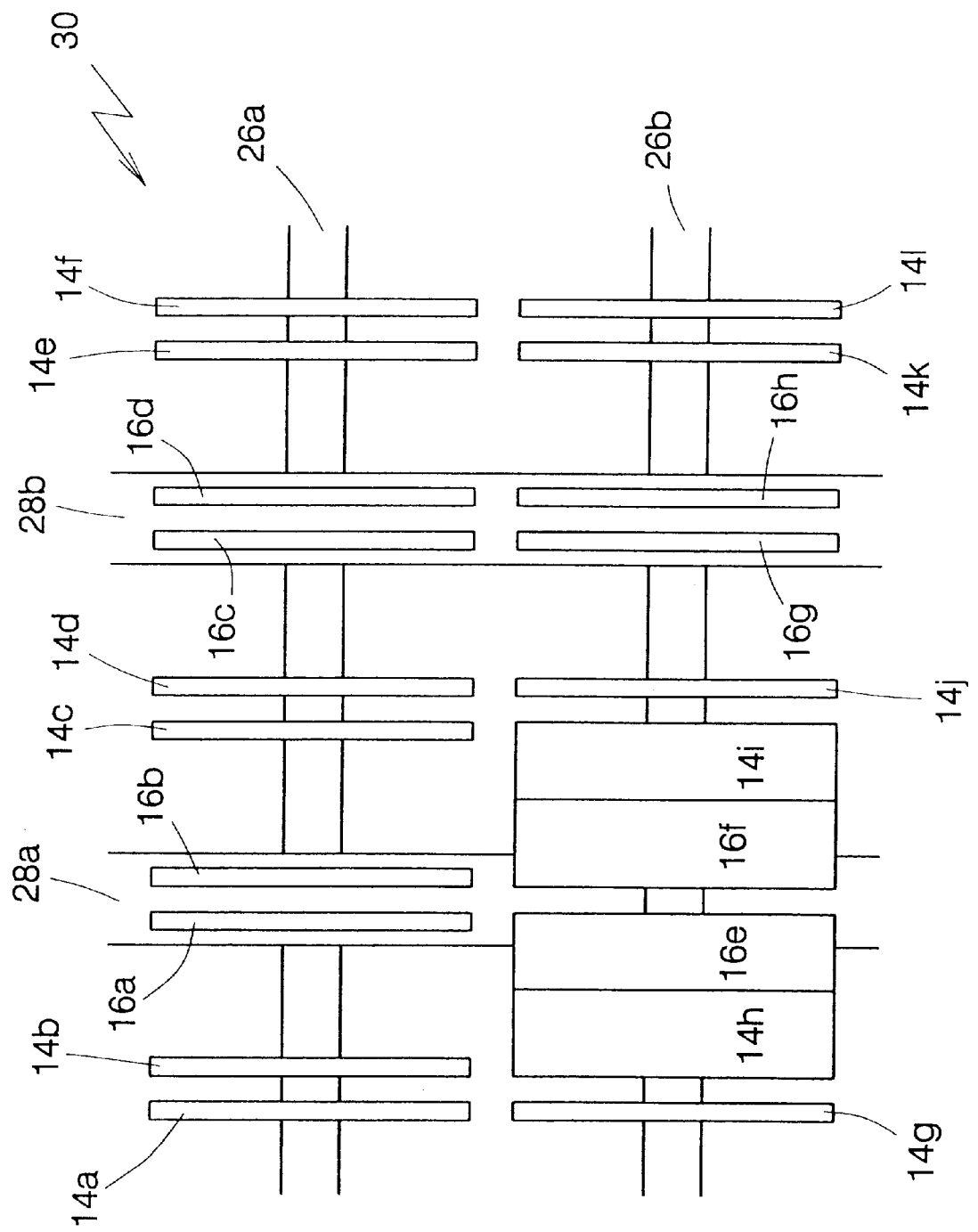
FIG. 3 is a partial plan view of a valve array of the present invention.
Figure 4:
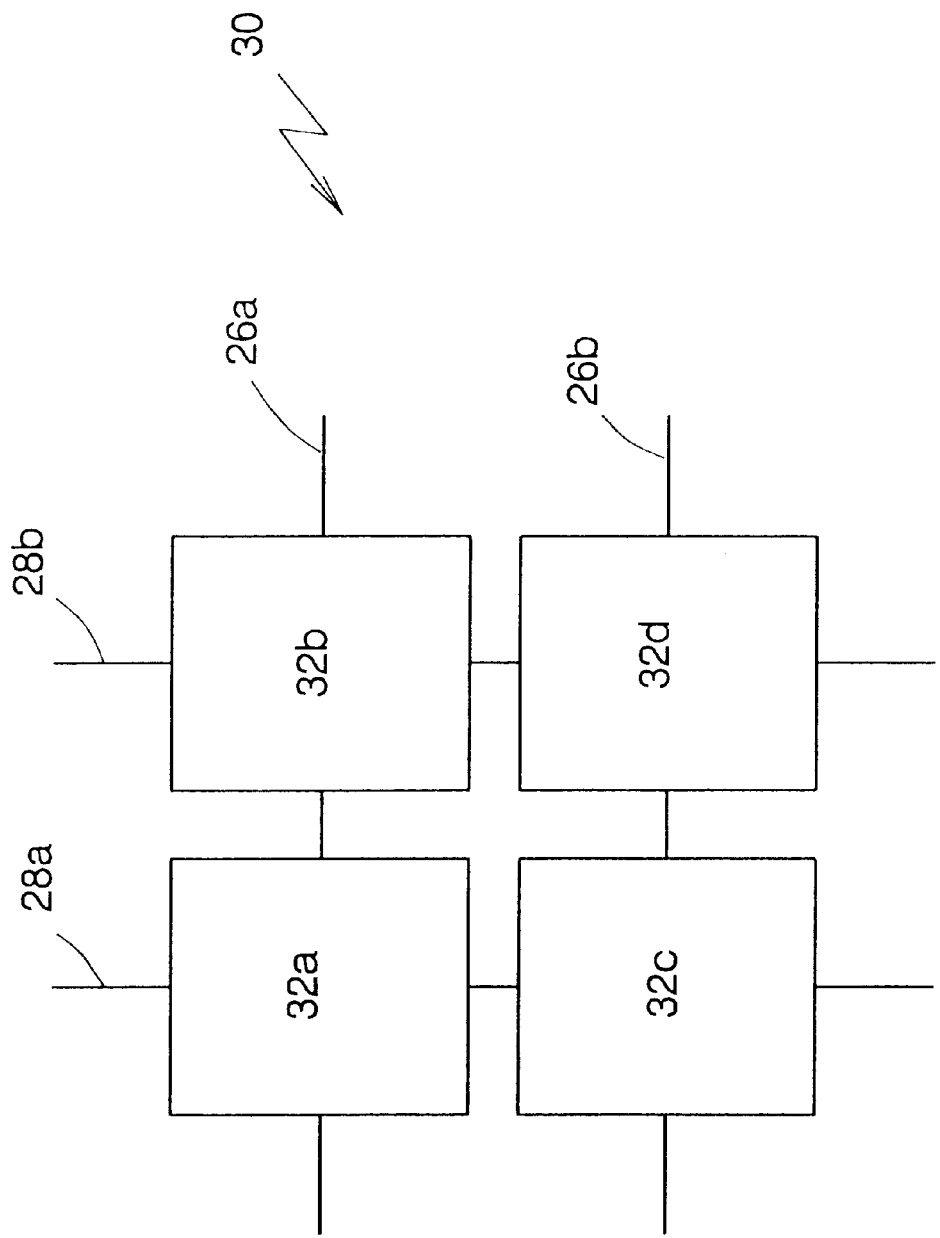
FIG. 4 is a partial schematic diagram of the valve array of FIG. 3.

Referring now to the drawings, FIGS. 3 and 4 are partial illustrations of an array 30 of radiation valves of the present invention. FIG. 3 is a plan view. FIG. 4 is a corresponding schematic diagram. Shown in FIGS. 3 and 4 are four valves 32a through 32d, each with four leaves. Valve 32a includes leaves 14b, 16a, 16b and 14c. Valve 32b includes leaves 14d, 16c, 16d and 14e. Valve 32c includes leaves 14h, 16e, 16f and 14i. Valve 32d includes leaves 14j, 16g, 16h and 14k. Leaves 14a, 14f, 14g and 14l are parts of neighboring valves that are not shown in their entirety in FIG. 3. Leaves 14a through 14f are mounted on a row control line 26a. Leaves 14g through 14l are mounted on a row control line 26b. Leaves 16a, 16b, 16e and 16f are mounted on a column control line 28a. Leaves 16c, 16d, 16g and 16h are mounted on a column control line 28b. Row control lines 26a and 26b are orthogonal to column control lines 28a and 28b. Row control lines 26a and 26b are formed directly on substrate surface 13. Column control lines 28a and 28b are formed above, and are electrically insulated from, row control lines 26a and 26b. In FIG. 3, valve 32c is shown closed, and valves 32a, 32b and 32d are shown open.

The valves of array 30 are addressable in any desired combination, and so can be opened and closed in any desired combination, by applying appropriate voltages to the row and column control lines. Consider, for example, the method used to keep open valves 32a and 32d while closing valves 32b and 32c. Let $\Delta=(V_2-V_1)/4$, and start with all four valves open. Apply a voltage of $-\Delta$ to row line 26a, a voltage of 0 to row line 26b, a voltage of $V_{BIAS}+\Delta$ to column line 28a and a voltage of $V_{BIAS}$ to column line 28b. The resulting voltage differences are: for valve 32a, $V_{BIAS}+2\Delta$; for valve 32b, $V_{BIAS}+\Delta$; for valve 32c, $V_{BIAS}+\Delta$; and for valve 32d, $V_{BIAS}$. Valve 32a closes, while the other three valves remain open. Next, apply a voltage of 0 to row line 26a, a voltage of $-\Delta$ to row line 26b, a voltage of $V_{BIAS}$ to column line 28a and a voltage of $V_{BIAS}+\Delta$ to column line 28b. The resulting voltage differences are: for valve 32a, $V_{BIAS}$; for valve 32b, $V_{BIAS}+\Delta$; for valve 32c, $V_{BIAS}+\Delta$; and for valve 32d, $V_{BIAS}+2\Delta$. Valve 32d closes, while valves 32b and 32c remain open. Because the voltage difference applied to valve 32a is between $V_{TH}$ and $V_{CR}$, valve 32a remains closed. In general, any desired configuration of open and closed valves is obtained by opening all the valves, which can be done by grounding all the row control lines and applying a voltage of $V_{BIAS}-2\Delta$ to all the column lines; and then successively applying a voltage of $-\Delta$ to each row line while grounding the other row lines and applying a voltage of $V_{BIAS}+\Delta$ to all the column control lines whose valves are to be closed in the target row. This voltage application scheme is illustrative. Those skilled in the art will be able to readily develop equivalent schemes.

Figure 5:
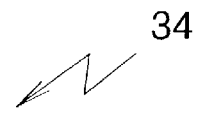
FIG. 5 shows a monochrome display pixel including valves of the present invention.

One straightforward application of the present invention is in a flat panel display. Each pixel of the display is composed of one valve, or several contiguous valves. FIG. 5 shows schematically a pixel 34 of a monochromatic display. Pixel 34 is composed of sixteen valves 36a through 36p. A 16 level gray scale is obtained via spatial modulation by opening any number of valves between none and all for the duration of one frame of the display. One particularly convenient way of selecting valves to open and close is to represent the intensity as a four-digit binary number and to assign specific groups of valves to the first, second, third and fourth digits, with the relative areas of the groups being in accordance with the significance of the corresponding digits. For example, valves 36a through 36h are assigned to the first digit, valves 36i through 36l are assigned to the second digit, valves 36m and 36n are assigned to the third digit and valve 36o is assigned to the fourth digit. If "1" means open and "0" means closed, and if the 16 levels of a gray scale are represented by binary numbers from 0000 and 1111, then, with valve 36p open, any one of the 16 levels is accessed by opening or closing the valves corresponding to each digit. In addition, closing all 16 valves provides a 17th level.

Alternatively, the valves of a single pixel may have different areas. For example, pixel 34 can be composed of 5 valves: a first valve having eight times the area of valves 36 and occupying the area of valves 36a through 36h, a second valve having four times the area of valves 36 and occupying the area of valves 36i through 36l, a third valve having twice the area of valves 36 and occupying the area of valves 36m and 36n, and valves 36o and 36p as before. The first valve is assigned to the first digit of the four-digit binary number that represents the intensity, the second valve is assigned to the second digit of the binary number, the third valve is assigned to the third digit of the binary number, and valve 36o is assigned to the fourth digit of the binary number.

As another alternative, a 16 level gray scale is obtained via temporal modulation, specifically, pulse width modulation, by opening valves 36 for between 1/16 and all of the duration of a single frame. Temporal and spatial modulation can be combined to produce a 256-level gray scale. Doubled resolution can be obtained by frame averaging, using the fact that the perceived gray level of a pixel in two successive frames is the average of the actual gray levels of the pixel in the two frames.

Figure 6:
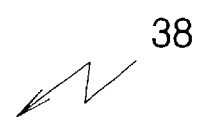
FIG. 6 shows a color display pixel including valves of the present invention.

FIG. 6 shows schematically a pixel 38 of a color display. Pixel 38 includes three groups of valves. Valves 40a through 40l are backed by red filters. Valves 42a through 42l are backed by green filters. Valves 44a through 44l are backed by blue filters. Arbitrary hues and intensities are obtained by opening and closing the appropriate valves for varying lengths of time during a single frame.

As is well known in the art, a color display can be achieved by other means. For example, an array of valves 34 can be used in a projector with a rotating color wheel that includes a red filter, a green filter and a blue filter. The wheel is rotated so that red light is directed at valves 34 for the first third of the duration of each frame, green light is directed at valves 34 for the middle third of the duration of each frame, and blue light is directed at valves 34 for the last third of the duration of each frame.

The above description relates to a transmissive-mode flat panel display. A monochromatic reflective-mode flat panel display is operated in the manner described above in connection with FIG. 5, except that the roles of closed valves 36 and open valves 36 are interchanged, so that the greater the number of valves 36 that block and reflect incident light, and the longer these blocking valves 36 are closed, the more intense is pixel 34.

To achieve 600 dpi resolution, pixels 34 and 38 should be about 40 microns on a side. This gives a lateral dimension for valves 36 of about 10 microns by 10 microns, and for valves 40, 42 and 44 of about 6 microns by 6 microns. In a projector, valves 36, 40, 42 and 44 typically are on the order of 5 to 10 microns on a side. In a flat panel display having pixels 34 or 38 that are 280 microns on a side, valves 36, 40, 42 and 44 are correspondingly larger.

Array 30 is fabricated by standard methods, such as are used to fabricate microelectronic devices, with one additional innovative process step.

Figure 7A:
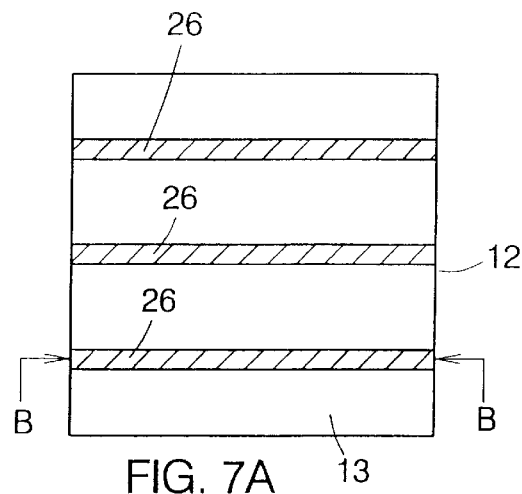
FIGS. 7A–7F and 8A–8D show steps in the fabrication of the valve array of FIG. 3.
Figure 7B:
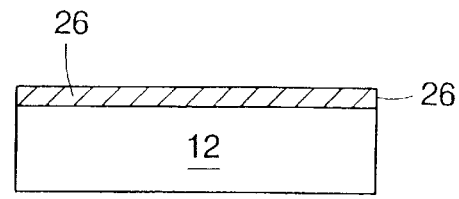
Figure 7C:
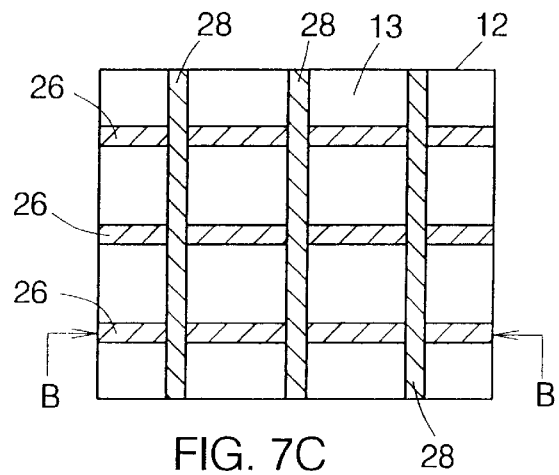
Figure 7D:
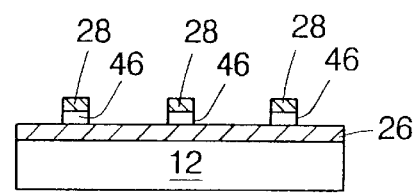
Figure 7E:
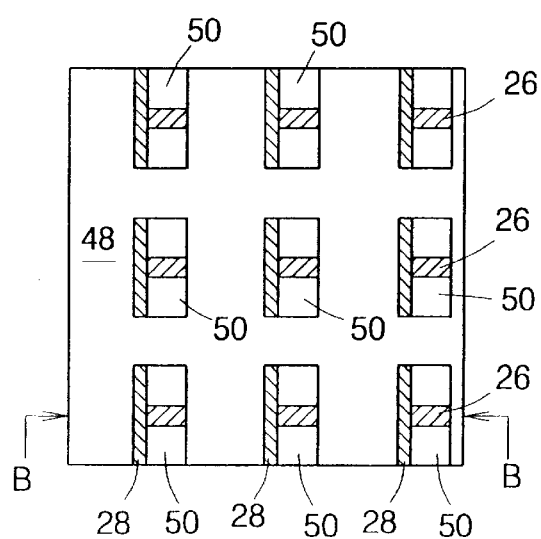

The first step is the deposition of row lines 26 on surface 13 of substrate 12, as shown from above in FIG. 7A and from the side, along cut B—B, in FIG. 7B. The second step is the deposition of insulating strips 46 orthogonal to row lines 26 and column lines 28 above insulating strips 46, as shown from above in FIG. 7C and from the side, along cut B—B, in FIG. 7D. The third step is the deposition of a layer 20 to 30 microns deep of photoresist 48 with rectangular holes 50 oriented as shown with respect to row lines 26 and column lines 28, as shown from above in FIG. 7E and from the side, along cut B—B, in FIG. 7F.

Figure 7F:
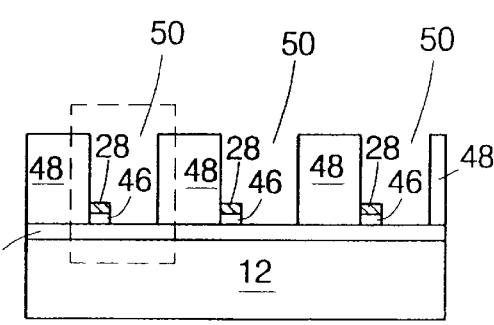
Figure 8B:
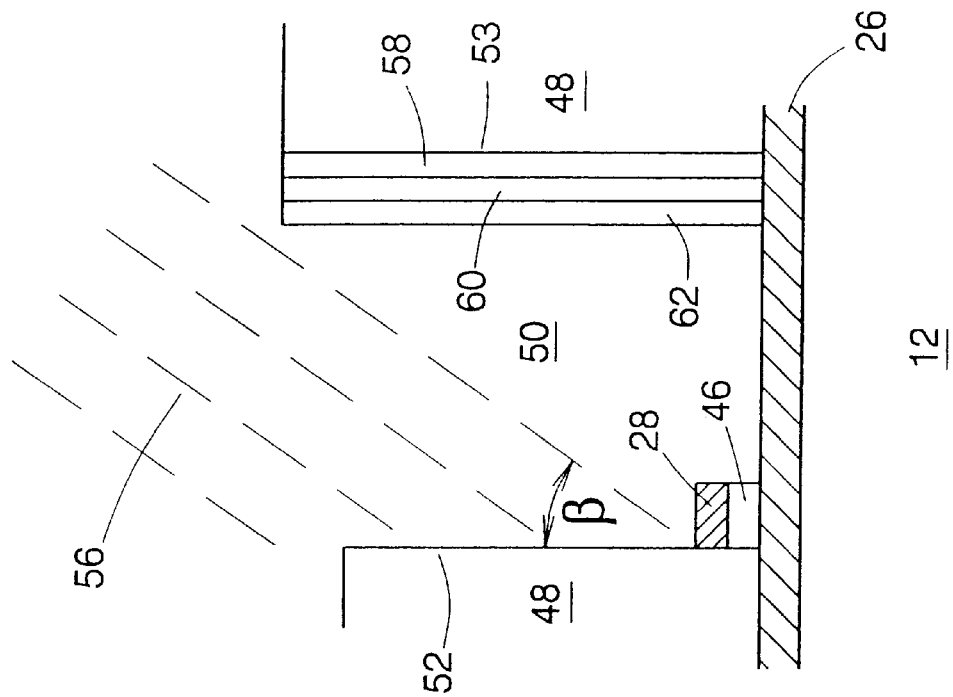
Figure 8A:
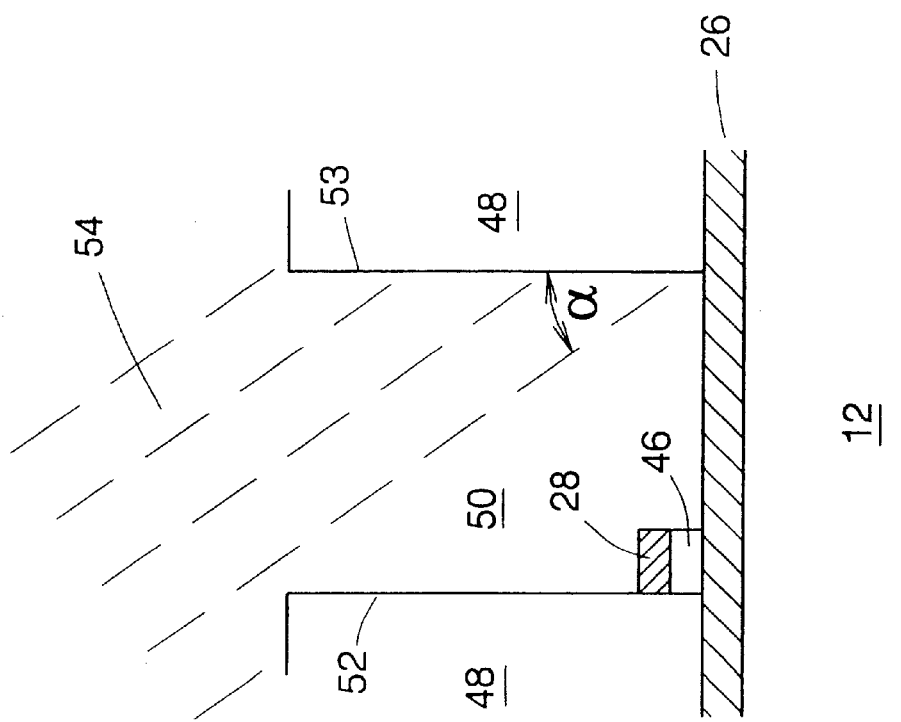

The next steps, in which leaves 14 and 16 are deposited, are illustrated in FIGS. 8A through 8D, which are enlarged views of the portion of FIG. 7F that is enclosed in a dashed box. FIGS. 8A and 8B show a hole 50 bounded by vertical surfaces 52 and 53 of photoresist 48. Hole 50 constitutes a gap between vertical surfaces 52 and 53 that is free of photoresist. A layer 58 of aluminum is deposited on surface 53 by directing a parallel beam of aluminum atoms at holes 50 at an oblique angle α from the vertical, so that the photoresist adjacent to surface 52 shadows beam 54, preventing deposition at the bottom of hole 50 to the left of surface 53. This is done by conventional vacuum evaporation. See, for example, *Handbook of Thin Film Technology* (L. I. Maissel and R. G. Lang, editors, McGraw Hill, 1970): Chapter 1, "Vacuum evaporation", pages 1-3 and 1-55; Chapter 7, "Generation of patterns in thin films", page 7-1. After a thickness of aluminum between about 50 nanometers and about 100 nanometers is deposited to form layer 58, a layer 60 of between about 250 nanometers and about 400 nanometers of amorphous silica is deposited over layer 58, and another layer 62 of between about 50 nanometers and about 100 nanometers of aluminum is deposited over layer 60. Like layer 58, layers 60 and 62 are deposited by directing parallel beams of the deposited material at holes 50 at an oblique angle slightly different from α. At the end of the fabrication process, layers 58 and 62 will be leaves 14.

Figure 8D:
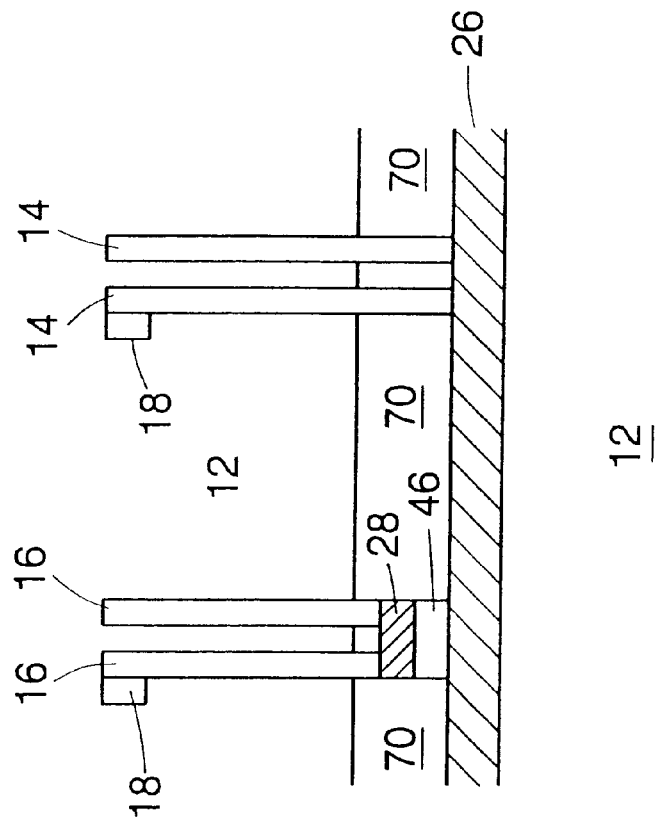
Figure 8C:
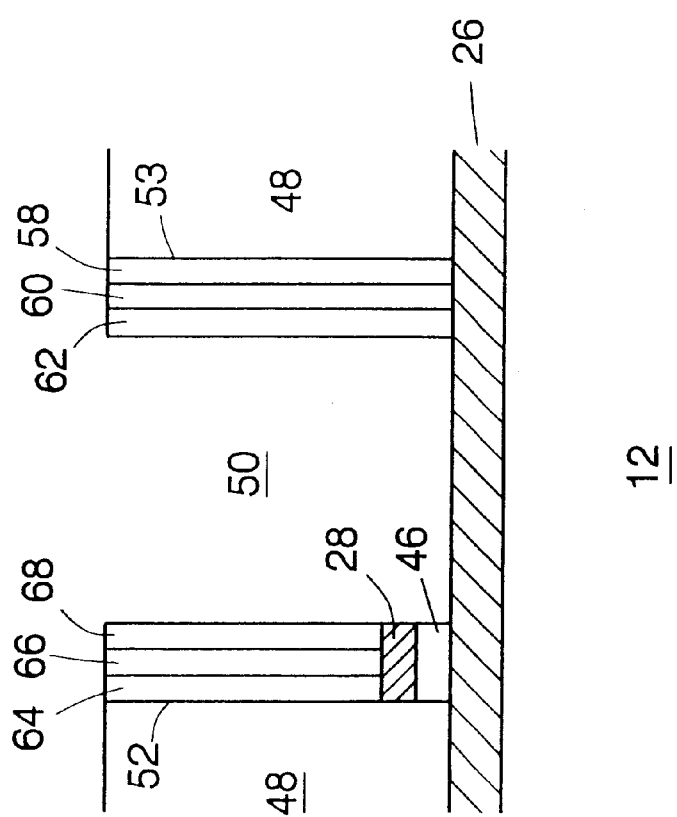

The same process is used to deposit a 50 to 100 nanometer thick layer 64 of aluminum, a 250 to 400 nanometer thick layer 66 of amorphous silica, and another 50 to 100 nanometer thick layer 68 of aluminum on surface 52, by directing parallel beams 56 of the deposited material at surface 52 at an oblique angle β, as illustrated in FIG. 8B. The result of this deposition is illustrated in FIG. 8C. At the end of the fabrication process, layers 64 and 66 will be leaves 16. Photoresist 48 now is removed, to leave layer sandwiches 58–60–62 and 64–66–68 as freestanding vertical walls. This process for forming a freestanding vertical wall on a substrate also is within the scope of the present invention. Amorphous silica is deposited around and above the freestanding walls and etched back to the level shown in FIG. 8D. The remaining amorphous silica 70 serves to anchor the resulting leaves 14 and 16. Note that this etchback also removes most of the amorphous silica of layers 60 and 66. Finally, the oblique deposition process is used, at a steep angle, to deposit amorphous silica contact barriers 18 towards the top of the outside surface of either the left leaf of each pair of leaves 14 and 16, as shown in FIG. 8D, or of the right leaf of each pair. In this final step, each pair of leaves 14 or 16 serves to shadow the pair of leaves immediately to its right or left.

Figure 9A:
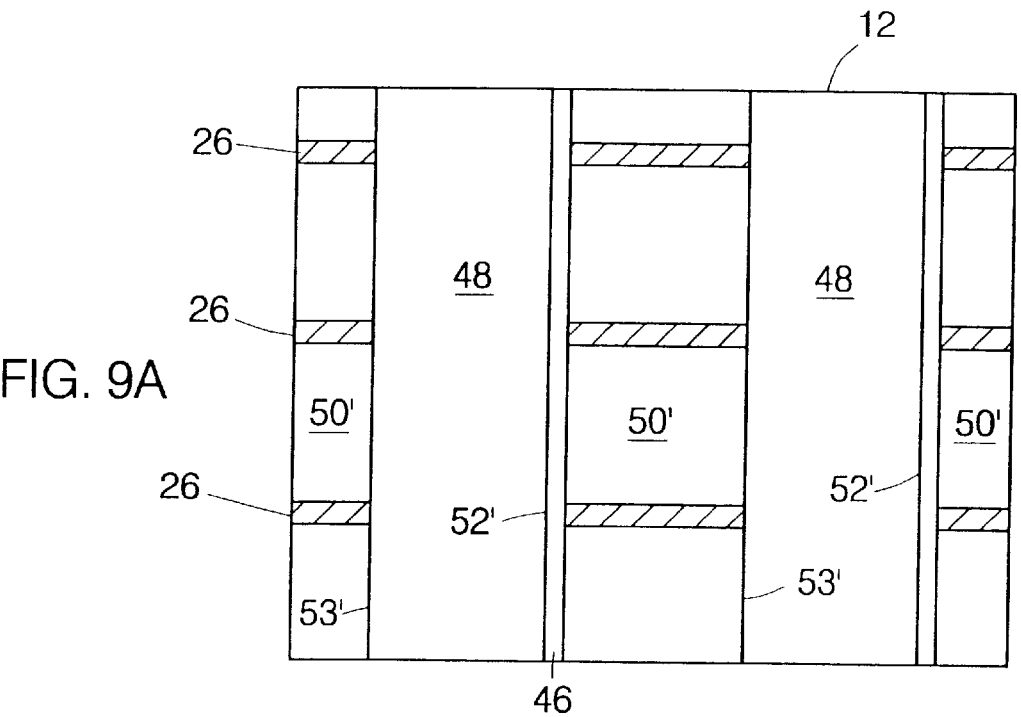
FIGS. 9A–9E show steps in the fabrication of a variant of the valve array of FIG. 3.
Figure 9B:
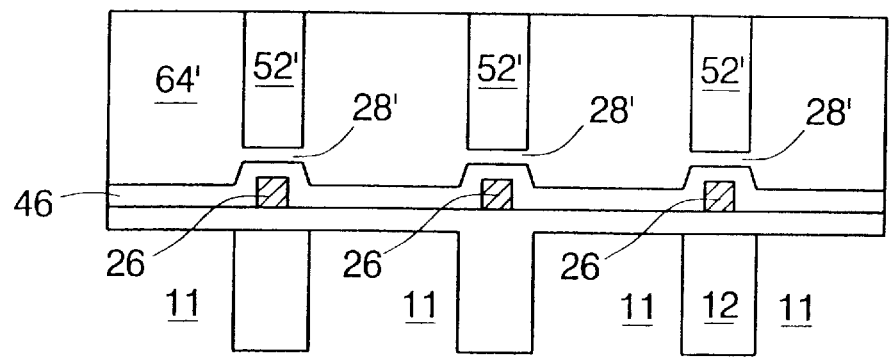
Figure 9C:
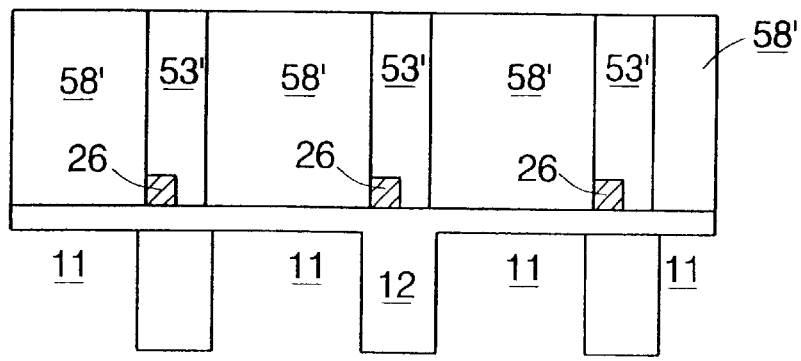

FIGS. 9A through 9E show steps in the fabrication of a variant of array 30. FIG. 9A corresponds to FIG. 7E and shows that in this variant, there are no column lines 28 deposited directly above insulating strips 46, and photoresist 48 is deposited as parallel walls perpendicular to row lines 26, with gaps 50' separating the walls of photoresist 48. The walls of photoresist 48 have sides 52' and 53' that are perpendicular to surface 13 of substrate 12. FIG. 9B shows a cut along one of surfaces 52' after the deposition thereon of aluminum layer 64', which corresponds to aluminum layer 64 of FIG. 8C. Layer 64' is deposited through a mask, leaving gaps above row lines 26 through which surface 52' is exposed. The thin portions of layer 64' that are separated from row lines 26 by insulating strip 46 will be sections of a column line 28'. FIG. 9B also shows that in this variant, substrate 12 includes holes 11 opposite the eventual locations of the valves. FIG. 9C shows a similar cut along one of surfaces 53' after the deposition thereon of aluminum layer 58', which corresponds to aluminum layer 58 of FIG.

Figure 9D:
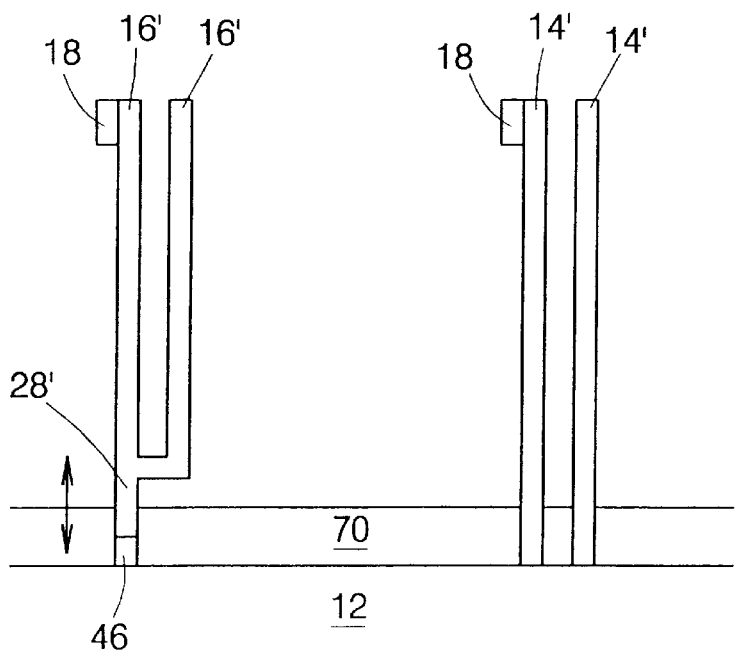
Figure 9E:
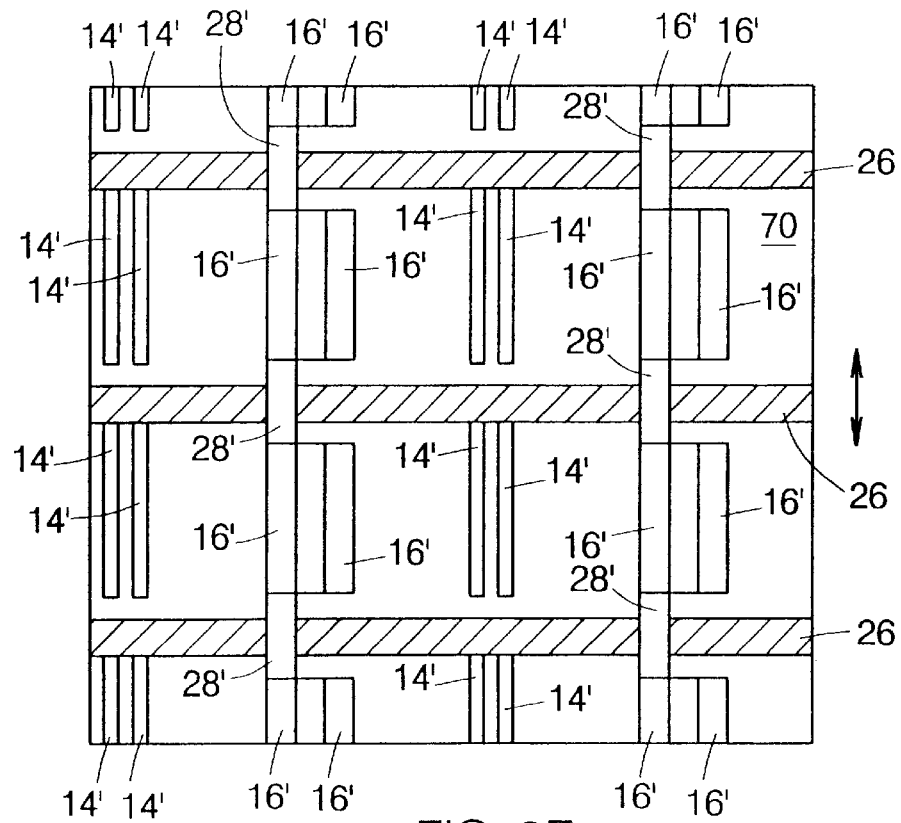

8C. Like layer 64', layer 58' is deposited through a mask, leaving gaps above row lines 26 through which surface 53' is exposed. FIG. 9D corresponds to FIG. 8D, and shows that at the end of fabrication, layer 64' has become a leaf 16' of one pair of leaves 16', and layer 58' has become a leaf 14' of another pair of leaves 14'. FIG. 9E is a plan view of a portion of this variant of array 30 at the end of fabrication. The common root of each leaf pair 16' is a portion of a column line 28'.

The masks through which layers 58' and 64' are deposited may be conventional photolithography masks. Alternatively, the masks may be provided by forming the walls of photoresist 48 with appropriate cutouts.

Note that in this variant of array 30, column lines 28' are deposited, along with leaves 16', on surfaces 52' of the walls of photoresist 48 instead of directly on surface 13 of substrate 12. In both this variant and the first variant, row lines 26 and column lines 28 or 28' are elongated parallelepipeds, with their long dimensions as long as surface 13 of substrate 12. Row lines 26 and column lines 28 have their short dimensions perpendicular to surface 13 and their intermediate dimensions parallel to surface 13. Column lines 28' have their short dimensions parallel to surface 13 and their intermediate dimensions perpendicular to surface 13. In FIG. 9E, the double-headed arrow shows the intermediate dimension of one of row lines 26. In FIG. 9D, the double-headed arrow shows the intermediate dimension of a column line 28'.

Figure 10A:
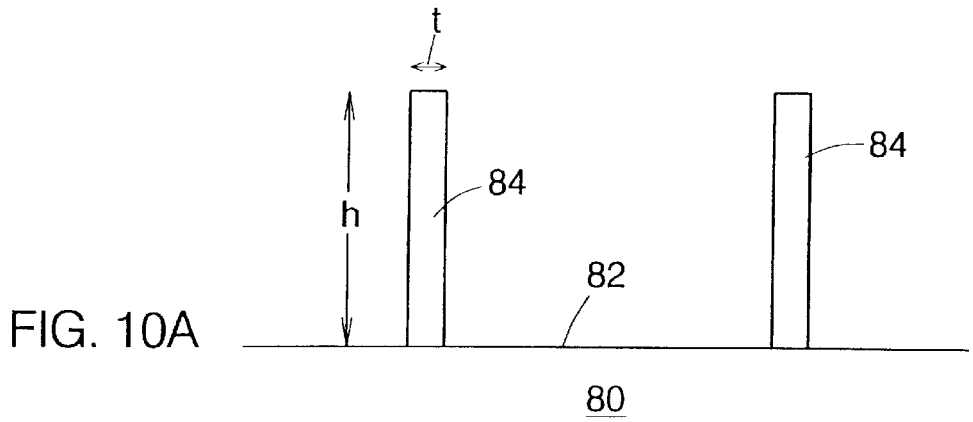
FIGS. 10A–10C show mesoscale structures of the present invention that cannot be fabricated by conventional photolithography.
Figure 10B:
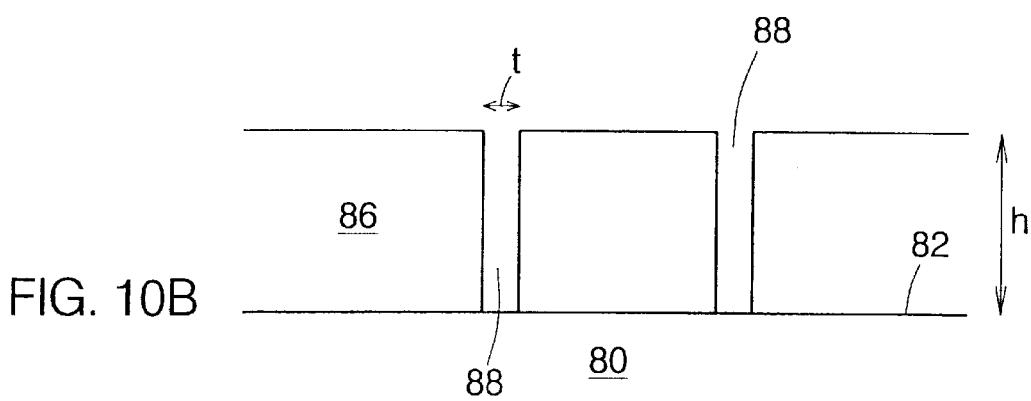
Figure 10C:
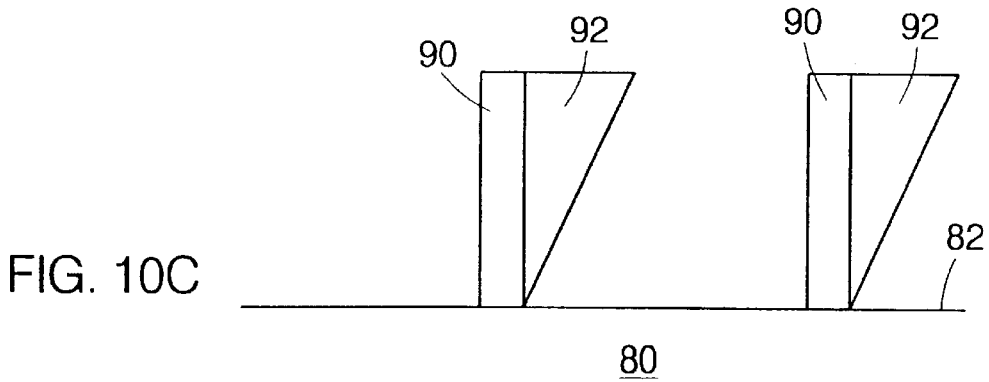

It will be appreciated that the techniques used to fabricate valve array 30 are applicable to the fabrication of mesoscale devices generally, and in particular to the fabrication of walls, perpendicular to substrates such as substrate 12, that are too thin or too high to be fabricated by prior art photolithography methods. FIGS. 10A through 10C are illustrative cross sections through structures that cannot be fabricated by prior art photolithography methods but can be fabricated by the method of the present invention. FIG. 10A shows walls 84, perpendicular to a surface 82 of a substrate 80, and having heights h of 5 microns and thicknesses t of 1 micron. FIG. 10B shows a layer 86 of thickness h of 5 microns above substrate 80, with gaps 88 in layer 86 of width t of 1 micron. Such extreme aspect ratios are not attainable using prior art photolithography methods. FIG. 10C shows double-layered walls deposited on substrate 80. Uniform layers 90 may be deposited either by photolithography or by the method described above of depositing photoresist walls on substrate 80, depositing layers 90 obliquely on the photoresist walls, and removing the photoresist. Layers 92, whose thicknesses increase with distance from substrate 80, are deposited on layers 90 by using layers 90 to shadow the gaps therebetween and continuously increasing the oblique angle at which the deposant of layers 92 is directed at substrate 82.

Figure 11:
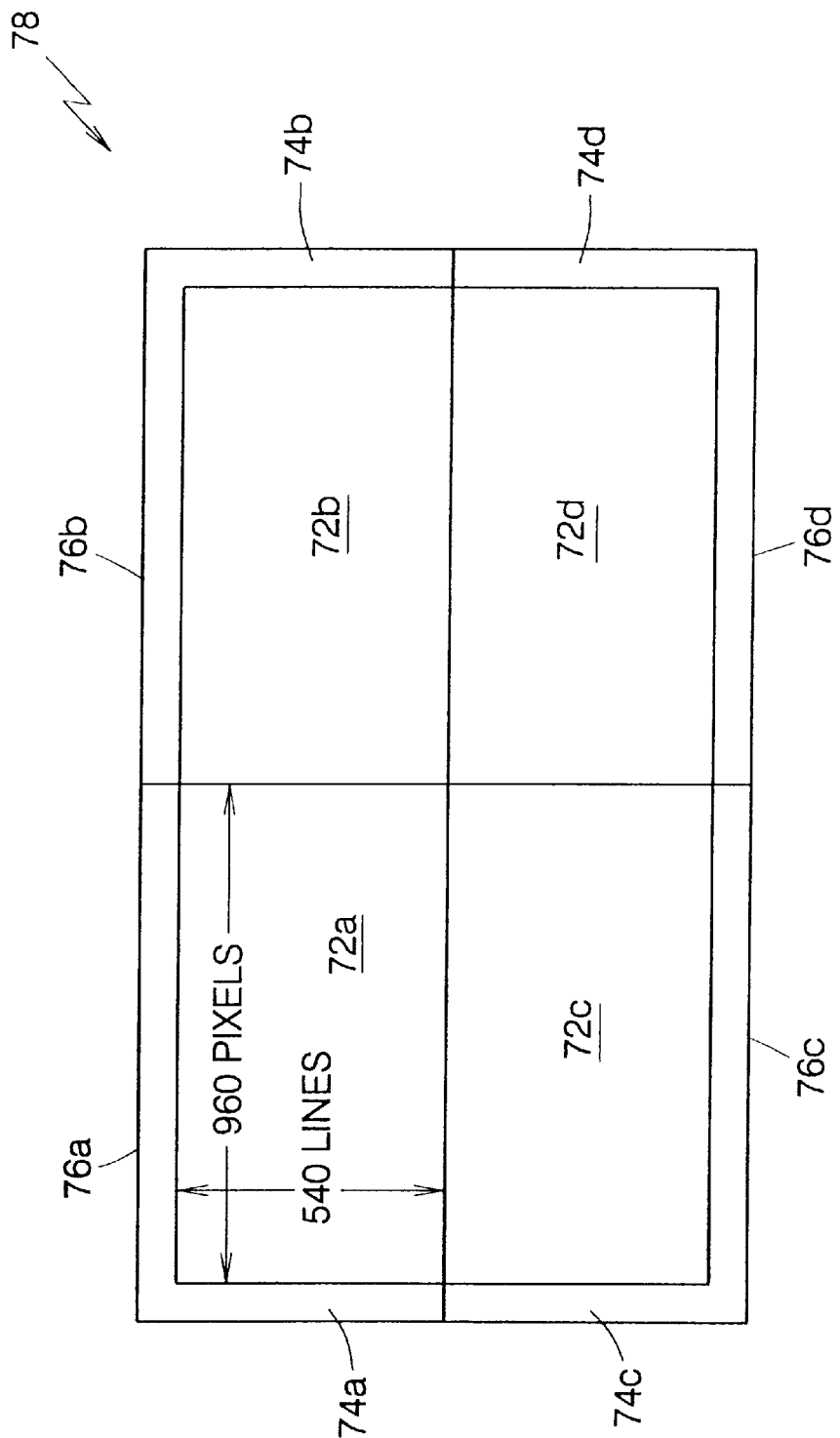
FIG. 11 is a schematic illustration of a high definition television screen based on the valve array of FIG. 3

FIG. 11 shows, schematically, a high definition television screen 78 fabricated as a four-part flat panel display of the present invention. Each independently operated portion 76 of television screen 78 includes an array 72 of valves of the present invention, similar to array 30 described above, and associated control electronics 74 for selective application of activation voltages to the row lines and column lines of array 72. Upper left portion 76a includes valve array 72a and control electronics 74a. Upper right portion 76b includes valve array 72b and control electronics 74b. Lower left portion 76c includes valve array 72c and control electronics 74c. Lower right portion 76d includes valve array 72d and control electronics 74d. Because arrays 72 are fabricated using the same methods as are used to fabricate integrated circuits, television screen 78 can be fabricated as an integrated device. For special applications, control electronics 74 include read only memory areas that are loaded, at fabrication, with application-dependent data and/or random access memory areas that can be programmed by users with application-dependent data. For example, in high definition television screen 78, the read-only memory is programmed with color parameters conforming to either the European standard or the American standard, so that valves analogous to valves 40, 42 and 44 can be opened and closed accordingly.

The protocol for opening and closing the valves of arrays 72 takes advantage of the mechanical properties of the valves. Valves fabricated as described above typically take about 5 microseconds to close, but only about 1.5 microseconds to open. In one of flat panel display portions 76, even if there is only one valve per pixel, setting all 540 lines independently of each other would require 540×6.5 microseconds=3.51 milliseconds. This is too long to achieve 16 gray scale level in a 16.6 millisecond (1/60 second) frame. Therefore, each flat panel display portion 76 is operated by operating all 540 lines independently, in 16 subframes per frame. In the first subframe, all the lines are closed successively. After each line is closed, and before the next line is closed, the valves, of the line that has just been closed, that correspond to pixels whose gray scale level=full illumination, are opened. As noted above, this takes 3.51 milliseconds. In each remaining subframe, the lines are scanned, and, in each line, all the valves that should be opened for the remaining duration of the entire frame are opened. For example, in the second subframe, all valves corresponding to pixels whose gray scale level=15/16 of full illumination are opened. Each of subframes 2 through 16 takes only 1.5×540 microseconds=0.81 milliseconds, so that the total time needed to display one frame is 15.66 milliseconds.

Control electronics 74 can be configured and used for other applications. For example, a device including array 72 and control electronics 74 can be used as a shutter in a slide projector or a movie projector, with control electronics 74 included in a feedback circuit that monitors the screen illumination and regulates the opening of the valves of array 72 to keep the screen illumination uniform. Similarly, in a projector that projects an image of a color display, if the display is created using a device similar to high definition television screen 78, color fidelity can be corrected by a similar feedback circuit that includes control electronics 74. The fact that control electronics 74 is displaced laterally from valve arrays 72 has the advantage, in applications such as projectors, of keeping control electronics 74 away from the intense incident light, thereby making it easier to keep control electronics 74 from overheating.

Figure 12:
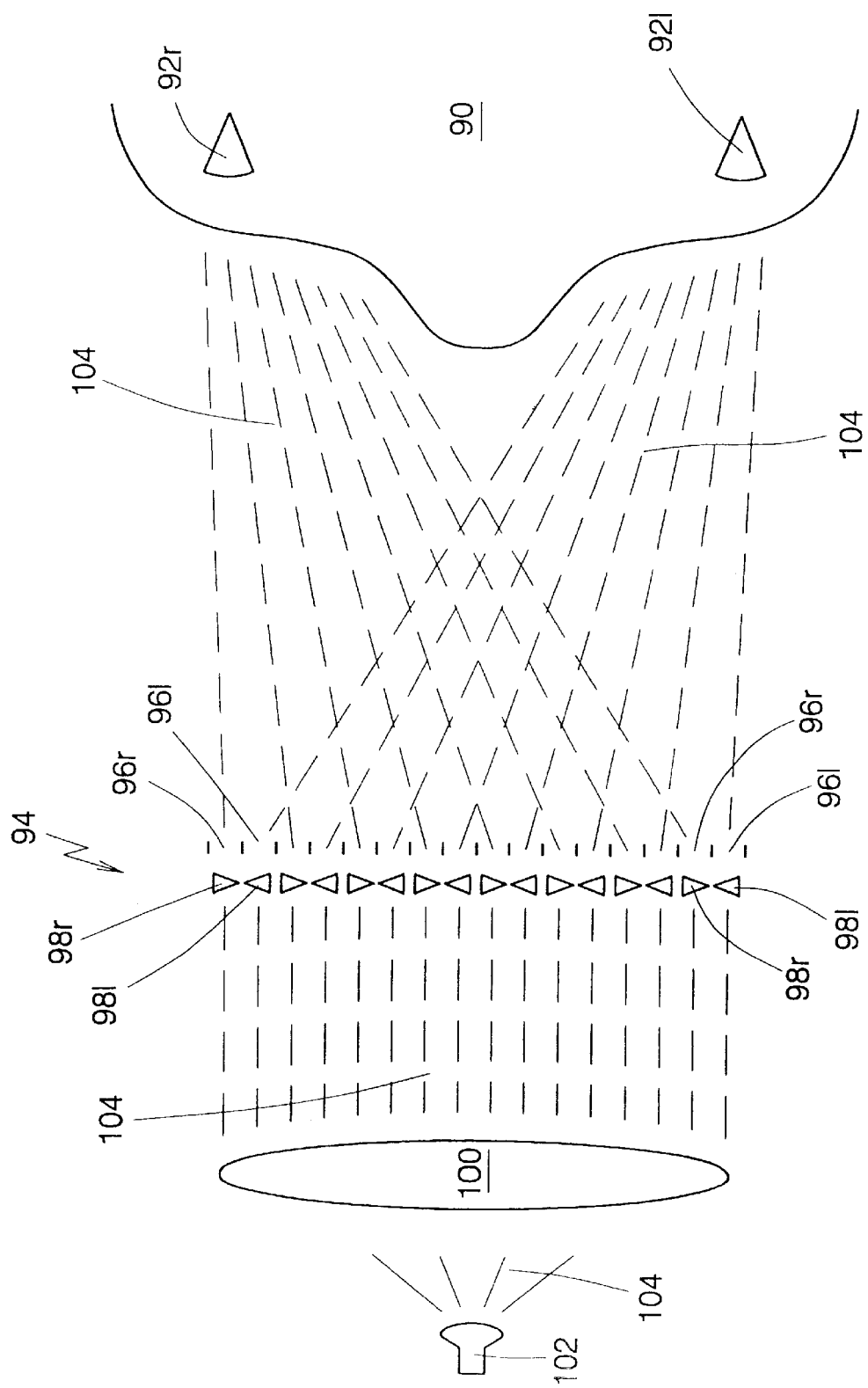
FIG. 12 is a schematic illustration of a three dimensional display based on the valve array of FIG. 3.

FIG. 12 shows schematically the use of an array 94 of interleaved valves 96r and 96l of the present invention as a component of a three-dimensional display, to provide the illusion of parallax to a user 90. Light 104 from a source 102 is collimated by a collimator, represented by convex lens 100, and directed at array 94. Array 94 includes, for each valve 96r or 96l, a refractive optical element 98r or 98l, specifically, a prism. Prisms 98r refract light 104 towards the right eye 92r of user 90. Prisms 98l refract light 104 towards the left eye 92l of user 90. Valves 96r are opened and closed in accordance with the display to be projected to right eye 92r. Valves 96l are opened and closed in accordance with the display to be projected to left eye 92l. For simplicity, only one row of array 94 is shown, it being understood that array 94 includes many such rows to project in dependent two-dimensional images at eyes 92r and 92l. Also for simplicity, all valves 96r and 96l are shown open. The leaves of valves 96r and 96l are moved in a direction perpendicular to the plane of FIG. 12 to open and close valves 96r and 96l.

While the invention has been described with respect to a limited number of embodiments, it will be appreciated that many variations, modifications and other applications of the invention may be made.

What is claimed is:

1. A three dimensional display for presenting an illusion of parallax to a first and second eye of a user, comprising:

(a) a source of light;

(b) an array of a plurality of valves, in a common plane, for alternately transmitting and blocking said light;

(c) a mechanism for directing said light via a first subset of said valves towards the first eye of the user; and (d) a mechanism for directing said light via a second subset of said valves towards the second eye of the user.

2. The display of claim 1, wherein said mechanisms include refractive optical elements.

3. The display of claim 1, wherein said first and second subsets of said valves are interleaved in said common plane.

* * * * *